United States Patent
Liang

(10) Patent No.: US 10,236,715 B2
(45) Date of Patent: Mar. 19, 2019

(54) SWITCH POWER CIRCUIT WITH BACKUP BATTERY FOR POWER SUPPLY

(71) Applicant: Dexin Liang, Huizhou (CN)

(72) Inventor: Dexin Liang, Huizhou (CN)

( * ) Notice: Subject to any disclaimer, the term of this patent is extended or adjusted under 35 U.S.C. 154(b) by 238 days.

(21) Appl. No.: 15/229,122

(22) Filed: Aug. 5, 2016

(65) Prior Publication Data

US 2017/0085123 A1    Mar. 23, 2017

Related U.S. Application Data

(63) Continuation of application No. PCT/CN2016/071190, filed on Jan. 18, 2016.

(30) Foreign Application Priority Data

Sep. 23, 2015 (CN) .................. 2015 2 0740677 U
Nov. 1, 2015 (CN) ....................... 2015 1 0723699

(51) Int. Cl.
*H02J 7/00* (2006.01)
*H02J 9/00* (2006.01)
*H02J 9/06* (2006.01)
*H02J 1/10* (2006.01)

(52) U.S. Cl.
CPC ............ *H02J 9/061* (2013.01); *H02J 1/108* (2013.01)

(58) Field of Classification Search
CPC ................................ H02J 9/061; H02J 1/108
USPC ........................................................ 307/66
See application file for complete search history.

(56) References Cited

U.S. PATENT DOCUMENTS 6,294,766 B1 *  9/2001  Autry ................. H02J 7/0026
                                                   219/507
2011/0038180 A1 * 2/2011 Yang ................. H02M 3/3376
                                                   363/17

FOREIGN PATENT DOCUMENTS

JP    2001078460    *  3/2001

* cited by examiner

*Primary Examiner* — Rexford Barnie
*Assistant Examiner* — Toan Vu
(74) *Attorney, Agent, or Firm* — Wayne & Ken, LLC; Tony Hom

(57) ABSTRACT

The present invention provides a switch power circuit with a backup battery for power supply, comprising an input rectifier module, an PWM switch control module, a transformer module, an output rectifier diode, a negative feedback module, a backup battery, an isolation diode unit and a zener diode; the anode of the output rectifier diode is connected with the positive output end of the transformer unit, the cathode of the output rectifier diode is connected with the cathode of the isolation diode unit, the anode of the isolation diode unit is connected with the anode of the backup battery, the cathode of the backup battery is connected with the negative output end of the transformer module; the cathode of the zener diode is connected between the cathode of the isolation diode unit and the cathode of the output rectifier diode; one end of the negative feedback module is connected with the anode of the zener diode, and the other end of the negative feedback module is connected with the control port of the PWM switch control module. The present invention has beneficial effects of reducing output consumption of switch power supply and increasing conversion efficiency of switch power supply.

3 Claims, 2 Drawing Sheets

SWITCH POWER CIRCUIT WITH BACKUP BATTERY FOR POWER SUPPLY

CROSS-REFERENCE TO RELATED APPLICATIONS

This application is a continuation of International Patent Application No. PCT/CN2016/071190 with a filing date of Jan. 18, 2016, designating the United States, now pending, and further claims priority to Chinese Patent Application No. 201510723699.9 with a filing date of Nov. 1, 2015 and No. 201520740677.9 with a filing date of Sep. 23, 2015. The content of the aforementioned applications, including any intervening amendments thereto, are incorporated herein by reference.

TECHNICAL FIELD

The invention relates to electronic technical field, in particular to a switch power circuit with backup battery for power supply.

BACKGROUND OF THE PRESENT INVENTION

In prior art, PMW switch power supply with backup battery is arranged, however, the general structure is to adopt multiple diodes for the isolation of two power supply units to prevent mutual flowing backward of two power supplies, two diodes are series connected to the output end of the battery to prevent charge of switch power supply to battery, and an isolation diode is series connected to the output end of the switch power supply to prevent the flowing backward of switch power supply from electric current of battery, and prevent the fast consumption of battery energy so as to lose backup function.

In light of higher requirements on conversion efficiency of power supply in every country and shortcomings existed in existing isolation technology, the isolation diode at the output end of the switch power supply will reduce output power of switch power supply greatly and increase conversion efficiency of switch power supply, which is badly in need of improvement.

SUMMARY OF PRESENT INVENTION

To overcome the shortcomings in prior art, the present invention provides an improved switch power circuit with backup battery for power supply.

The present invention provides a switch power circuit with a backup battery for power supply, comprising an input rectifier module, an PWM switch control module, a transformer module, an output rectifier diode, a negative feedback module, a backup battery, an isolation diode unit and a zener diode;

The input rectifier module, the PWM switch control module and the transformer module are connected in sequence, the anode of the output rectifier diode is connected with the positive output end of the transformer unit, the cathode of the output rectifier diode is connected with the cathode of the isolation diode unit, the anode of the isolation diode unit is connected with the anode of the backup battery, the cathode of the backup battery is connected with the negative output end of the transformer module; the cathode of the zener diode is connected between the cathode of the isolation diode unit and the cathode of the output rectifier diode; one end of the negative feedback module is connected with the anode of the zener diode, and the other end of the negative feedback module is connected with the control port of the PWM switch control module.

The present invention utilizes the reverse conduction and the reverse cut-off characteristics of the zener diode, considering the rectifier diode of the switch power supply output end isolates the discharge from the backup battery to the conventional switch power supply module, the isolation diode of the switch power supply output end in the prior art is directly cancelled, and considering when the conventional switch power supply module of the switch power circuit with backup battery for power supply works, the output voltage is X volts, the voltage of the backup battery is set as Z volts in advance, and rated value of the zener diode is Y volts. The relationship between X, Y and Z is X>Y>Z, when the conventional switch power supply module is normal power supply, the zener diode plays voltage stabilization effect, and the stabilization of output voltage can be adjusted by the negative feedback module; and the voltage of the backup battery is lower than threshold value of the zener diode, when conventional switch power supply module has problem and is not normal power supply, the zener diode realizes the isolation function to the backup battery, and prevents the backup battery to discharge to the conventional switch power supply module, which reduces output consumption of switch power supply and increases conversion efficiency of switch power supply.

The purpose, functional characteristics and advantages of the present invention are further explained with reference to embodiments and drawings.

DETAILED DESCRIPTION OF PREFERRED EMBODIMENTS

The present invention is fully described with reference to related drawings for better understanding. Drawings show the preferred embodiments of the present invention. However, the present invention can be realized by many different modes, and is not limited to the embodiments described herein. And the purpose of these embodiments is to thoroughly and fully disclose the present invention.

It needs to be explained that when a component is referred to as "fixed in" another components, it means the component can be directly fixed on another component or a component may be existed in between. When a component is referred to as "connect with" another component, it means the component can be directly connected to another component or a component may be existed in between. The terms "perpendicular", "horizontal", "left", "right" and other similar terms herein are only for explanation.

Unless otherwise defined, all technical and scientific terms used herein are the same with general accepted meaning by the skilled in the art. The terms used herein are only for explaining the embodiments, and the present invention is not limited by these terms. The terms "and/or" used herein includes one or more combination of related items listed.

Figure 1:
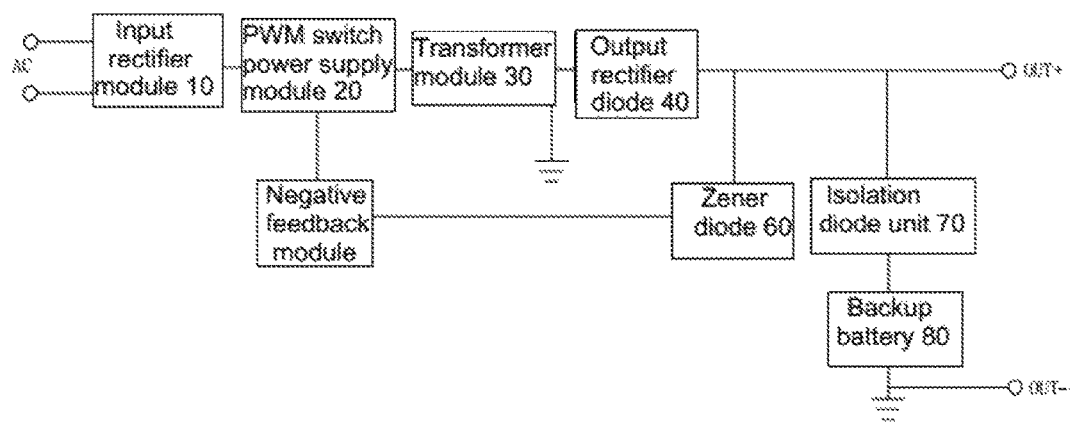
FIG. 1 is a functional block diagram in one preferred embodiment of switch power circuit with backup battery for power supply according to the present invention.

FIG. 1 shows a switch power circuit with a backup battery power supply in the first embodiment of the present invention, which comprises an input rectifier module (10), an PWM switch control module (20), a transformer module (30), an output rectifier diode (40), a negative feedback module (50), a backup battery (80), an isolation diode unit (70) and a zener diode (60); The input rectifier module (10), the PWM switch control module (20), the transformer module (30), the output rectifier diode (40), and the negative feedback module (50) constitutes basic function modules of switch power supply, and also constitutes conventional switch power supply module. Wherein the transformer module (30) adopts coil coupling, and the negative feedback module (50) adopts photoelectrical coupling, but is not limited thereto.

Wherein the input rectifier module (10), the PWM switch control module (20) and the transformer module (30) are connected in sequence, the anode of the output rectifier diode (40) is connected with the secondary positive output end of the transformer unit (30), the cathode of the output rectifier diode (40) is connected with the cathode of the isolation diode unit (70), the anode of the isolation diode unit (70) is connected with the anode of the backup battery (80), the cathode of the backup battery (80) is connected with the negative output end of the transformer module (30); the cathode of the zener diode (60) is connected between the cathode of the isolation diode unit (70) and the cathode of the output rectifier diode (40); one end of the negative feedback module (50) is connected with the anode of the zener diode (60), and the other end of the negative feedback module (50) is connected with the control port of the PWM switch control module (20).

The present invention utilizes the reverse conduction and the reverse cut-off characteristics of the zener diode (60), considering the rectifier diode (40) of the switch power supply output end isolates the discharge from the backup battery (80) to the conventional switch power supply module, the isolation diode of the switch power supply output end in the prior art is directly cancelled, and when the conventional switch power supply module of the switch power circuit with backup battery for power supply works, the output voltage is set as X volts in advance, the voltage of the backup battery (80) is set as Z volts in advance, and rated value of the zener diode 60 is Y volts. The relationship between X, Y and Z is X>Y>Z, when the conventional switch power supply module is normal power supply, the zener diode 60 plays voltage stabilization effect, and the stabilization of output voltage can be adjusted by the negative feedback module (50); and the voltage of the backup battery (80) is lower than threshold value of the zener diode (60), when conventional switch power supply module has problem and is not normal power supply, the zener diode (60) realizes the isolation function to the backup battery (80), and prevents the backup battery (80) to discharge to the conventional switch power supply module, which reduces output consumption of switch power circuit and increases conversion efficiency of switch power circuit.

Figure 2:
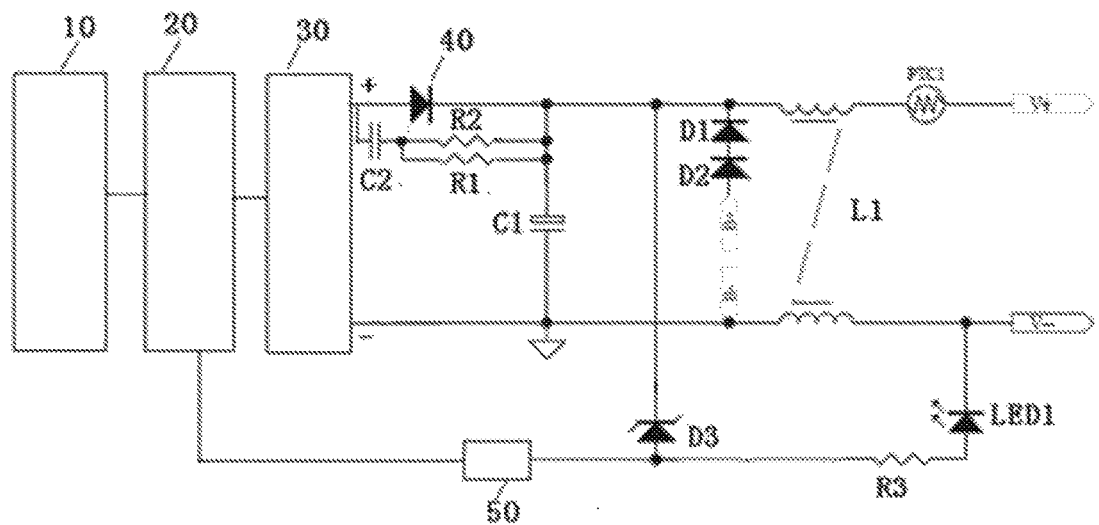
FIG. 2 is a schematic circuit diagram in one preferred embodiment of switch power circuit with backup battery for power supply according to the present invention.

Specifically, as FIG. 2 shown, the switch circuit with a backup battery for power supply also comprises a filter capacitor C1, one end of the filter capacitor C1 is connected between the cathode of the isolation diode unit (70) and the cathode of the output rectifier diode (40), and the other end of the filter capacitor C1 is connected with the negative output end of the transformer module (30). The isolation diode unit (70) comprises an isolation diode and at least two isolation diodes in series. In this embodiment, the isolation diode unit (70) comprises a first isolation diode D1 and a second isolation diode D2 in series.

It should be understood that the number of the zener diode (60) is not limited to one, it can be two or three. In this embodiment, the zener diode (60) comprises a first zener diode D3.

The switch power circuit with a backup battery for power supply also comprises a first common mode choke (L1), two input ends of the first common mode choke (L1) are respectively connected with the cathode of the isolation diode unit (70) and the cathode of the backup battery (80).

The switch power circuit with a backup battery for power supply also comprises a light emitting diode (LED 1) and a divider resistance (R3). One end of the divider resistance R3 is connected between the anode of the first zener diode (D3) and the negative feedback circuit (50), the other end of the divider resistance (R3) is connected with the anode of the light emitting diode (LED 1), the cathode of the light emitting diode (LED 1) is connected with the negative output end of the switch power circuit with a backup battery for power supply.

Preferably, the input rectifier module (10) comprises a fuse, a high voltage capacitor, a second common mode choke and a bridge rectifier, the fuse, the bridge rectifier and the PWM switch control module are connected in sequence, wherein the fuse is tandem connected to AC input terminal, and the high voltage capacitor is parallel connected to the two output ends of the bridge rectifier.

Above disclosure merely shows several embodiments of the present invention, the description is concrete and detailed, but not limited to the scope of the present invention. It should be rioted that any variations and improvements based on the invention concept that may come into the mind of those ordinary in the art shall fall into the protection scope of the present invention. Therefore, the protection scope of the invention shall be limited by the claims.

I claim:

1. A switch power circuit with a backup battery for power supply, comprising:
an input rectifier module, an PWM switch control module, a transformer module, an output rectifier diode, a negative feedback module, a backup battery, an isolation diode unit and a zener diode; the input rectifier module, the PWM switch control module and the transformer module are connected in sequence; an anode of the output rectifier diode is connected with a first output end of the transformer unit; a cathode of the output rectifier diode is connected with a cathode of the isolation diode unit; an anode of the isolation diode unit is connected with an anode of the backup battery; a cathode of the backup battery is connected with a second output end of the transformer module; a cathode of the zener diode is connected between the cathode of the isolation diode unit and the cathode of the output rectifier diode; a first end of negative feedback module is connected with an anode of the zener diode; and a second end of the negative feedback module is connected with a control port of the PWM switch control module; the switch power circuit further comprises a first common mode choke, two input ends of the first common mode choke are respectively connected with the cathode of the isolation diode unit and the cathode of the backup battery;
a rated value of the zener diode is larger than a voltage of the backup battery; and an output voltage of the switch power supply module is larger than the rated value of zener diode.

2. The switch power circuit of claim 1, characterized in that the switch power circuit further comprises a filter capacitor, a first end of the filter capacitor is connected between the cathode of the isolation diode unit and the cathode of the output rectifier diode, and a second end of the filter capacitor is connected with the second output end of the transformer module.

3. The switch power circuit of claim 2, wherein the isolation diode unit comprises at least two isolation diodes in series.

\* \* \* \* \*